US008861190B2

(12) United States Patent
Kim (10) Patent No.: US 8,861,190 B2
(45) Date of Patent: Oct. 14, 2014

(54) DISPLAY DEVICE

(75) Inventor: HyunChul Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 144 days.

(21) Appl. No.: 13/561,221

(22) Filed: Jul. 30, 2012

(65) Prior Publication Data

US 2013/0044417 A1 Feb. 21, 2013

(30) Foreign Application Priority Data

Aug. 18, 2011 (KR) ........................ 10-2011-0082294

(51) Int. Cl.
 *H05K 5/03* (2006.01)
 *H05K 5/02* (2006.01)
 *G02F 1/1333* (2006.01)

(52) U.S. Cl.
 CPC ............ *G02F 1/133308* (2013.01); *H05K 5/02* (2013.01); *G02F 2201/465* (2013.01); *G02F 2001/133314* (2013.01); *G02F 2001/13332* (2013.01)
 USPC ............ 361/679.24; 361/679.01; 361/679.21; 349/58; 349/60

(58) Field of Classification Search
 USPC ............. 361/679.24, 679.01, 679.02, 679.21; 348/794, 373; 349/58
 See application file for complete search history.

(56) References Cited

U.S. PATENT DOCUMENTS

| | | | |
|---|---|---|---|
| 6,392,723 B1 * | 5/2002 | Sugiyama et al. .............. 349/58 |
| 6,560,124 B1 * | 5/2003 | Irie et al. ....................... 361/816 |
| 6,894,739 B2 * | 5/2005 | Sung et al. ...................... 349/58 |
| 7,961,457 B2 * | 6/2011 | Huang ..................... 361/679.21 |
| 8,437,120 B2 * | 5/2013 | Lee et al. ................ 361/679.01 |
| 2001/0003471 A1 * | 6/2001 | Lee et al. .......................... 349/58 |
| 2003/0227581 A1 * | 12/2003 | Sung et al. ...................... 349/58 |
| 2004/0212756 A1 * | 10/2004 | Fukayama et al. ............. 349/58 |
| 2007/0263347 A1 * | 11/2007 | Hong et al. .................... 361/681 |
| 2009/0180049 A1 * | 7/2009 | Lee et al. ......................... 349/58 |
| 2009/0225254 A1 * | 9/2009 | Matsuzawa et al. ............ 349/58 |
| 2010/0141863 A1 * | 6/2010 | Chang ............................. 349/58 |
| 2010/0220257 A1 * | 9/2010 | Sakamoto et al. .............. 349/58 |
| 2010/0238365 A1 * | 9/2010 | Hisakawa ........................ 349/11 |
| 2010/0321594 A1 * | 12/2010 | Takata ........................... 348/794 |

(Continued)

FOREIGN PATENT DOCUMENTS

| | | |
|---|---|---|
| CN | 2789802 Y | 6/2006 |
| CN | 1877398 A | 12/2006 |

(Continued)

OTHER PUBLICATIONS

The First Office Action dated Apr. 28, 2014 from the State Intellectual Property Office of the People's Republic of China in counterpart Chinese application No. 201210237020.1.

*Primary Examiner* — Robert J Hoffberg
*Assistant Examiner* — Michael Matey
(74) *Attorney, Agent, or Firm* — Morgan, Lewis & Bockius LLP (57) ABSTRACT

Disclosed is a display device which can prevent a rear cover from being damaged when a front cover is coupled to or decoupled from the rear cover. The display device includes a rear cover, a coupling member, and a front cover. The rear cover includes a receiving space for receiving a display panel. The coupling member is detachably coupled to the rear cover. The front cover is formed to surround a front border portion of the display panel, and detachably coupled to the coupling member.

19 Claims, 7 Drawing Sheets

(56) References Cited

U.S. PATENT DOCUMENTS

2011/0116217 A1\* 5/2011 Lee et al. .................. 361/679.01
2013/0135804 A1\* 5/2013 Takechi et al. ............ 361/679.01
2013/0308074 A1\* 11/2013 Park et al. ....................... 349/58

FOREIGN PATENT DOCUMENTS

| CN | 1971342 A | 5/2007 |
| CN | 201611548 U | 10/2010 |
| JP | 2009244845 A | 10/2009 |

\* cited by examiner

FIG. 11 ed, and particularly, research is being conducted for reduc-

DISPLAY DEVICE

CROSS-REFERENCE TO RELATED APPLICATIONS

This application claims the benefit of the Korean Patent Application No. 10-2011-0082294 filed on Aug. 18, 2011, which is hereby incorporated by reference as if fully set forth herein.

BACKGROUND

1. Field of the Invention

The present invention relates to a display device, and more particularly, to a display device which can prevent a rear cover from being damaged when a front cover is coupled to or decoupled from the rear cover.

2. Discussion of the Related Art

Recently, display devices having various flat display panels, such as liquid crystal display panels, plasma display panels, and organic light emitting display panels, are being practically used instead of Cathode Ray Tube (CRT) display devices. Such display devices are being slimmed and lightening the width (hereinafter referred to as a Bezel width) of a border region that surrounds an edge portion of each of the display panels.

Generally, a related art display device includes: a display panel; a receiving case that receives the display panel; a rear cover that receives the receiving case; and a front cover that surrounds a side of the rear cover and a front border portion of the display panel. Herein, the rear cover is hook-coupled to the front cover.

In the related art display device, since the front cover is hook-coupled to the rear cover, the rear cover can be damaged when the front cover is coupled to or decoupled from the rear cover.

SUMMARY

Accordingly, the present invention is directed to providing a display device that substantially obviates one or more problems due to limitations and disadvantages of the related art.

An aspect of the present invention is directed to providing a display device which can prevent a rear cover from being damaged when a front cover is coupled to or decoupled from the rear cover.

Another aspect of the present invention is directed to providing a display device which can reduce the Bezel width.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and the claims as well as the accompanying drawings.

To achieve these and other advantages and in accordance with the purpose of the invention, as embodied and broadly described herein, there is provided a display device including: a rear cover forming a receiving space for receiving a display panel; a coupling member detachably coupled to the rear cover; and a front cover formed to surround a front border portion of the display panel, and detachably coupled to the coupling member.

In another aspect of the present invention, there is provided a display device including: a rear cover comprising a side wall which forms a receiving space for receiving a display panel; a coupling member detachably coupled to the side wall; and a front cover formed to surround a front border portion of the display panel, and detachably coupled to the coupling member, wherein the coupling member comprises: a coupling plate comprising a hook coupling hole to be coupled to the front cover; a pair of bosses protruding from an inner side surface of the coupling plate and to be inserted into the side wall, with the hook coupling hole being between the pair of bosses; and a pair of hook coupling protrusions respectively formed at both sides of the coupling plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
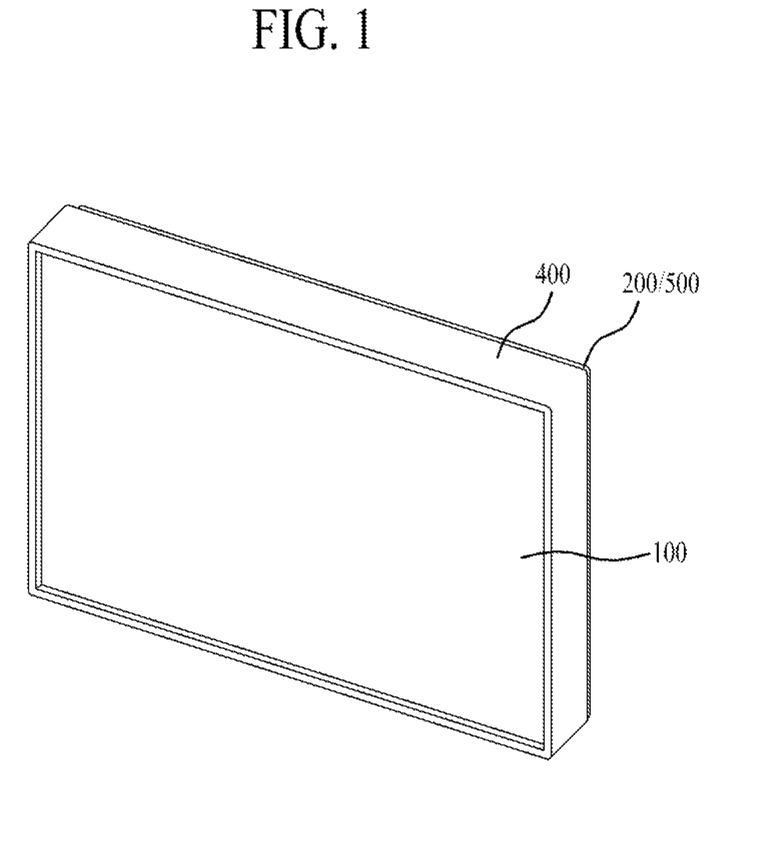
FIG. 1 is a view for describing a display device according to an embodiment of the present invention.
Figure 2:
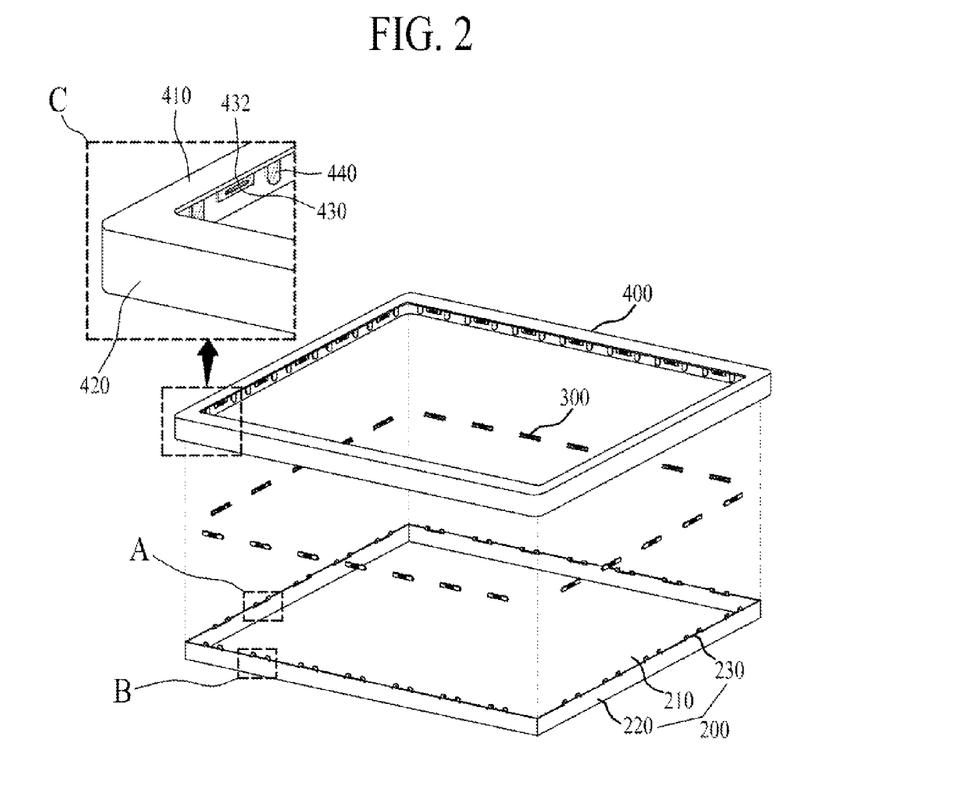
FIG. 2 is a view for describing a coupling structure for coupling a front cover and a rear cover, in a display device according to a first embodiment of the present invention.

FIG. 1 is a view for describing a display device according to an embodiment of the present invention. FIG. 2 is a view for describing a coupling structure for coupling a front cover and a rear cover, in a display device according to a first embodiment of the present invention.

Referring to FIGS. 1 and 2, the display device according to the first embodiment of the present invention includes: a rear cover 200 that has a receiving space for receiving a display panel 100; a coupling member 300 that is detachably coupled to the rear cover 200; and a front cover 400 that is provided to surround a front border portion of the display panel 100 and detachably coupled to the coupling member 300.

The display panel 100 may be a flat display panel such as a liquid crystal display panel, a plasma display panel, or an organic light emitting display panel. Herein, when the display panel 100 is the liquid crystal display panel, the display device according to the first embodiment includes: a receiving case (not shown) that is placed in the receiving space of the rear cover 200; a backlight unit (not shown) that is disposed in the receiving case; and a guide frame (not shown) that is supported by the receiving case to support the display panel 100.

The rear cover 200 is provided to have the receiving space and receives the display panel 100. For this end, the rear cover 200 includes a rear plate 210 and a side wall 220 for forming the receiving space, and a first coupling part 230 that is formed at the side wall 220 and to be coupled to the coupling member 300.

The rear plate 210 is formed of a metal material or a plastic material to have a flat type, thereby supporting the display panel 100.

The side wall 220 is bent vertically from the edge of the rear plate 210 to form the receiving space for receiving the display panel 100.

Figure 3A:
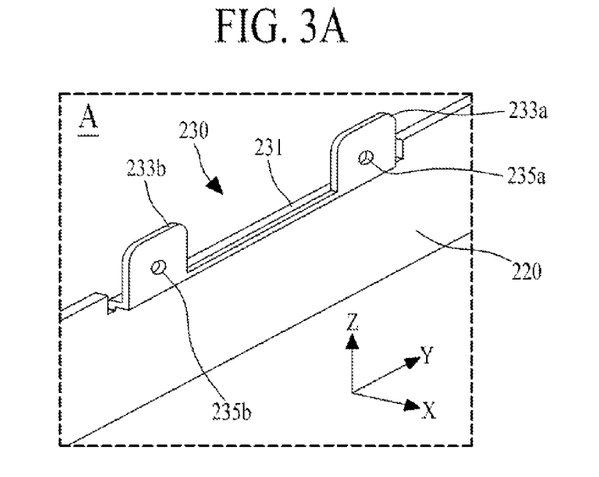
FIG. 3A is an enlarged view of a portion A in FIG. 2.
Figure 3B:
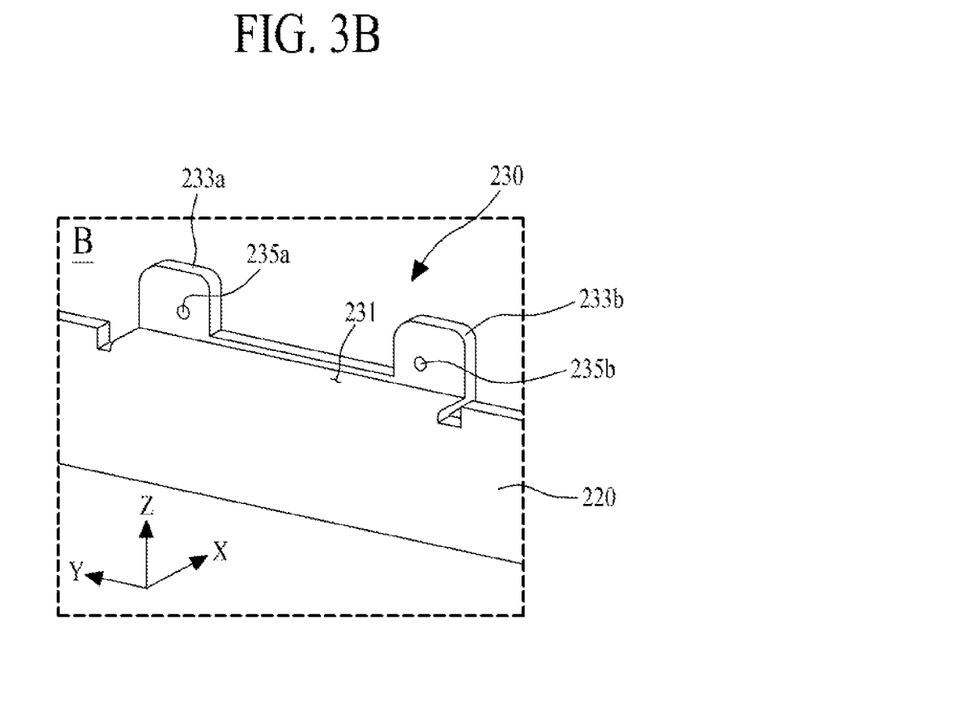
FIG. 3B is an enlarged view of a portion B in FIG. 2.

The first coupling part 230 is to be coupled to the coupling member 300 to prevent the movement of the coupling member 300 in the X-axis direction (for example, a direction toward the receiving space), the Y-axis direction (for example, a length direction of the side wall), and the Z-axis direction (for example, a height direction of the side wall). For this end, as illustrated in FIGS. 3A and 3B, the first coupling part 230 includes a bending part 231, a pair of protruding pieces 233a and 233b, and a pair of inserting holes 235a and 235b.

The bending part 231 is bent toward the receiving space from the side wall 220 to have a certain length from the side wall 220. The bending part 231 supports the coupling member 300.

The pair of protruding pieces 233a and 233b protrudes vertically from the bending part at both sides of the bending part 231 to have a certain height from the bending part 231 and separated from each other by a certain distance in a direction parallel to the side wall 220. The pair of protruding pieces 233a and 233b is coupled to the coupling member 300, thereby preventing the movement of the coupling member 300 in the X-axis direction.

The pair of inserting holes 235a and 235b is formed to respectively pass through the pair of protruding pieces 233a and 233b. The pair of inserting holes 235a and 235b are coupled to the coupling member 300, and thus prevent the movement of the coupling member 300 in the Y-axis and Z-axis directions.

The first coupling part 230 is formed in plurality to have a certain interval, on the side wall 220. For example, the rear cover 200 may include: fourteen first coupling parts 230 that are formed at a long side of the side wall 220; and ten first coupling parts 230 that are formed at a short side of the side wall 220, but the present embodiment is not limited thereto. As another example, the number of first coupling parts 230 may vary according to the size of the display panel 100.

Figure 4:
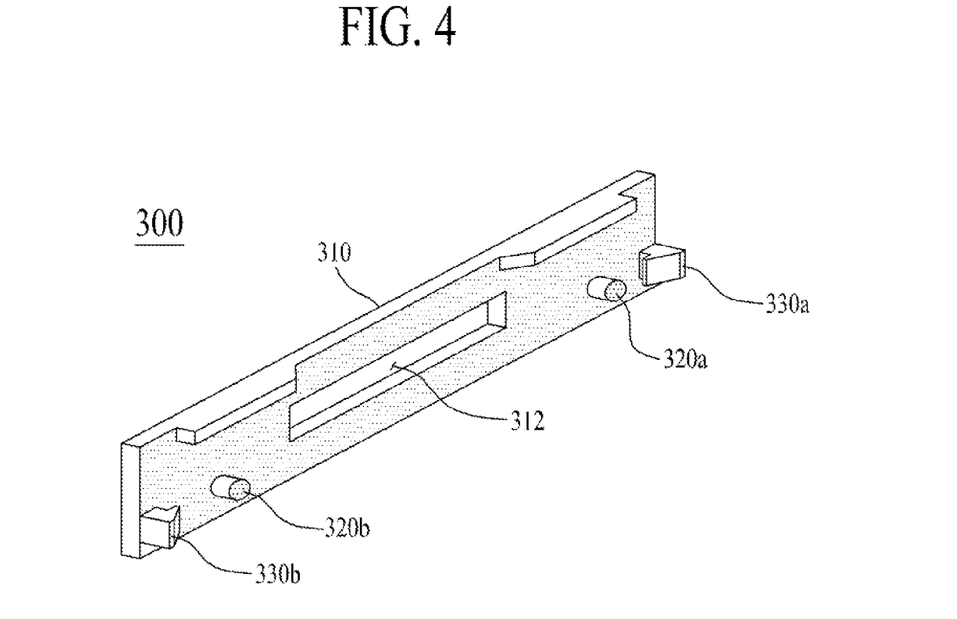
FIG. 4 is a view for describing a coupling member of FIG. 2.

The coupling member 300, as illustrated in FIG. 4, include a coupling plate 310, a pair of bosses 320a and 320b, and a pair of second coupling parts 330a and 330b.

The coupling plate 310 is formed in a flat type to have a hook coupling hole 312 which is to be coupled to the front cover 400. Herein, the coupling plate 310 may be formed of a soft material, for smooth coupling to or decoupling from the first coupling part 230 of the rear cover 200. The coupling plate 310, as illustrated in (a) and (b) in FIG. 5, rests on the bending part 231 of the first coupling part 230 when the coupling member 300 is coupled to the first coupling part 230.

The pair of bosses 320a and 320b protrudes to have a certain height from an inner side surface of the coupling plate 310, with the hook coupling hole 312 therebetween. As illustrated in (a) and (b) in FIG. 5, when coupled to the first coupling part 230, the pair of bosses 320a and 320b is inserted into the pair of inserting holes 235a and 235b, respectively. Accordingly, the movement of the coupling member 300 in the Y-axis and Z-axis directions is prevented by the pair of bosses 320a and 320b that is respectively inserted into the pair of inserting holes 235a and 235b.

The pair of second coupling parts 330a and 330b is formed at both sides of the coupling plates 310, respectively. Herein, the pair of second coupling parts 330a and 330b is formed in a hook coupling protrusion shape. As illustrated in (a) and (b) in FIG. 5, when coupled to the first coupling part 230, the pair of second coupling parts 330a and 330b is coupled to the pair of protruding pieces 233a and 233b of the first coupling part 230, respectively. Accordingly, the movement of the coupling member 300 in the X-axis and Y-axis directions is prevented by the coupling between the second coupling part 330a and the protruding piece 233a and the coupling between the second coupling part 330b and the protruding piece 233b.

Figure 5:
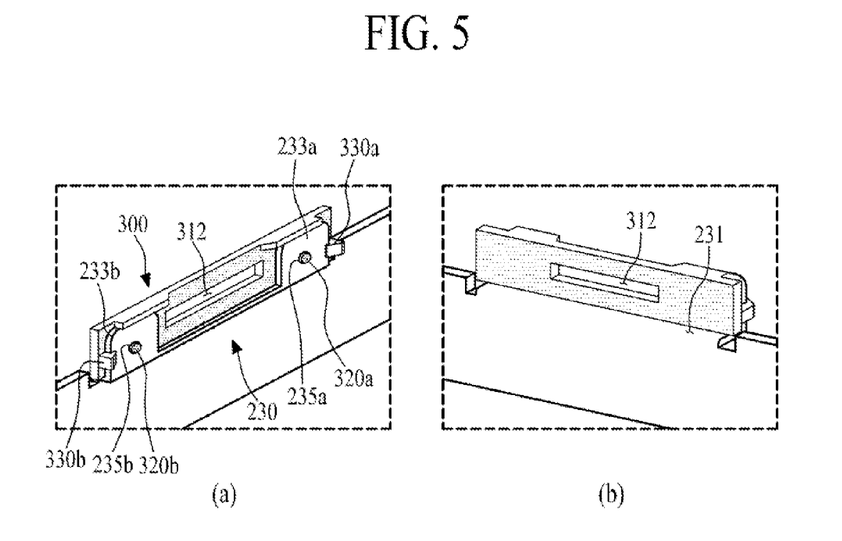
FIG. 5 is a view illustrating the coupling member which is coupled to a rear cover of FIG. 2.

When coupled to the first coupling part 230, the coupling member 300 rests on the bending part 231 of the first coupling part 230, and detachably coupled to the first coupling part 230 through the pair of bosses 320a and 320b and second coupling parts 330a and 330b. Accordingly, the movement of the coupling member 300 in the X-axis, Y-axis, and Z-axis directions is prevented by the coupling structure of the first coupling part 230.

Referring again to FIGS. 1 and 2, the front cover 400 is formed in a rectangular frame shape. The front cover 400 is coupled to a plurality of the coupling members 300 which have been coupled to the rear cover 200, and thus surrounds a front border portion of the display panel 100 (which is placed in the rear cover 200) and a side surface of the rear cover 200. For this end, as illustrated in an enlarged portion C in FIG. 2, the front cover 400 includes a front cover part 410, a side cover part 420, and a third coupling part 430.

The front cover part 410 surrounds the front border portion of the display panel 100.

The side cover part 420 is bent vertically from a distal end of the front cover part 410, thereby surrounding the rear cover 200 (i.e., the side surface of the side wall 220).

Figure 6:
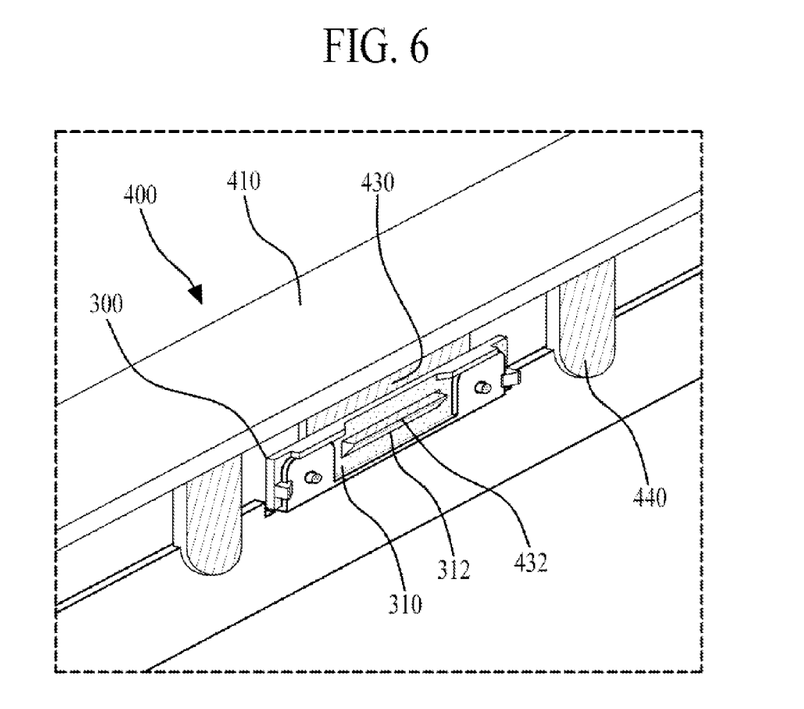
FIG. 6 is a view illustrating a coupled state of the rear cover, coupling member, and front cover of FIG. 2.

The third coupling part 430 is formed vertically from the bottom of the front cover part 410, in parallel to the side cover part 420. On the other hand, the third coupling part 430 may be formed from an inner surface of the side cover part 420. The third coupling part 430, as illustrated in FIG. 6, is coupled to the hook coupling hole 312 that is formed in the coupling plate 310 of the coupling member 300. For this end, the third coupling part 430 includes a hook member 432 which is to be inserted into the hook coupling hole 312.

The display device according to the first embodiment of the present invention, as illustrated in the enlarged portion C in FIG. 2, may further include an interval maintaining member 440 that is formed in the front cover 400 and maintains a constant interval between the front cover part 410 of the front cover 400 and the side wall 220 of the rear cover 200.

The interval maintaining member 440 is formed vertically from the bottom of the front cover part 410 to be adjacent to both sides of each of a plurality of the third coupling parts 430 that are formed in the front cover 400. The interval maintaining member 440, as illustrated in FIG. 6, rests on the side wall 220 when the front cover 400 is coupled to the coupling members 300, and thus maintains a constant interval between the front cover part 410 of the front cover 400 and the side wall 220 of the rear cover 200.

In the display device according to the first embodiment of the present invention, by coupling the coupling member 300 to the rear cover 200 and coupling the front cover 400 to the coupling member 300, the rear cover 200 can be prevented from being damaged when the front cover 400 is coupled to or decoupled from the rear cover 200. Moreover, the rear cover 200, the coupling member 300, and the front cover 400 are coupled to each other through a hook coupling scheme, thus improving assemblability. Furthermore, by coupling the flat type coupling member 300 to the first coupling part 230 including the bending part 231 which is bent toward the receiving space from the side wall 220 of the rear cover 200, the Bezel width of the display device can be reduced.

Figure 7:
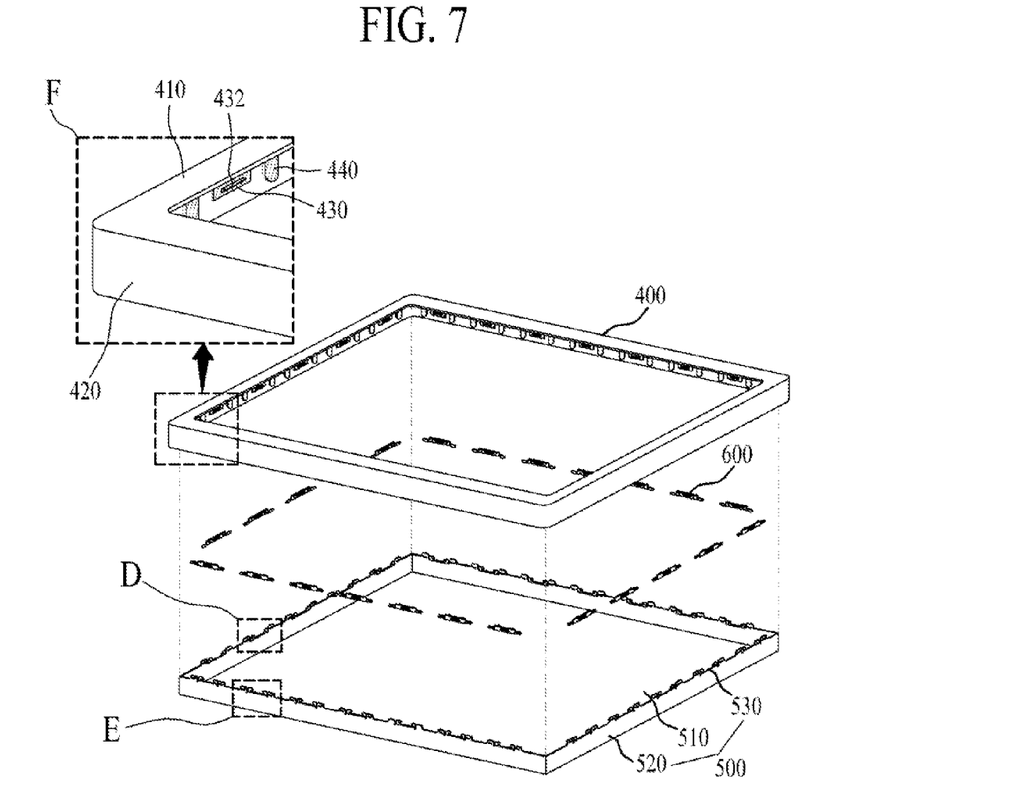
FIG. 7 is a view for describing a coupling structure for coupling a front cover and a rear cover, in a display device according to a second embodiment of the present invention.

FIG. 7 is a view for describing a coupling structure for coupling a front cover and a rear cover, in a display device according to a second embodiment of the present invention.

Referring to FIGS. 1 and 7, the display device according to the second embodiment of the present invention includes: a rear cover 500 that has a receiving space for receiving the display panel 100; a coupling member 600 that is detachably coupled to the rear cover 500; and a front cover 400 that is provided to surround a front border portion of the display panel 100 and detachably coupled to the coupling member 600.

The display panel 100 may be a flat display panel such as a liquid crystal display panel, a plasma display panel, or an organic light emitting display panel. Herein, when the display panel 100 is the liquid crystal display panel, the display device according to the second embodiment includes: a receiving case (not shown) that is placed in the receiving space of the rear cover 500; a backlight unit (not shown) that is disposed in the receiving case; and a guide frame (not shown) that is supported by the receiving case to support the display panel 100.

The rear cover 500 is provided to have the receiving space and receives the display panel 100. For this end, the rear cover 500 includes a rear plate 510 and a side wall 520 for forming the receiving space, and a first coupling part 530 that is formed at the side wall 520 and to be coupled to the coupling member 600.

The rear plate 510 is formed of a metal material or a plastic material to have a flat type, thereby supporting the display panel 100.

The side wall 520 is bent vertically from the edge of the rear plate 510 to form the receiving space for receiving the display panel 100.

Figure 8A:
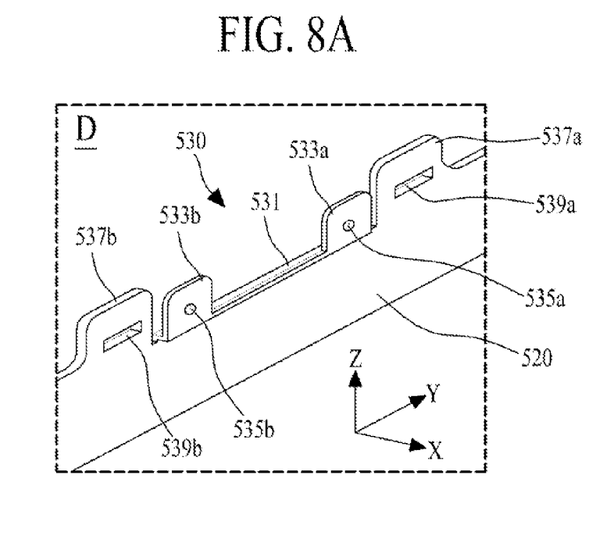
FIG. 8A is an enlarged view of a portion D in FIG. 7.
Figure 8B:
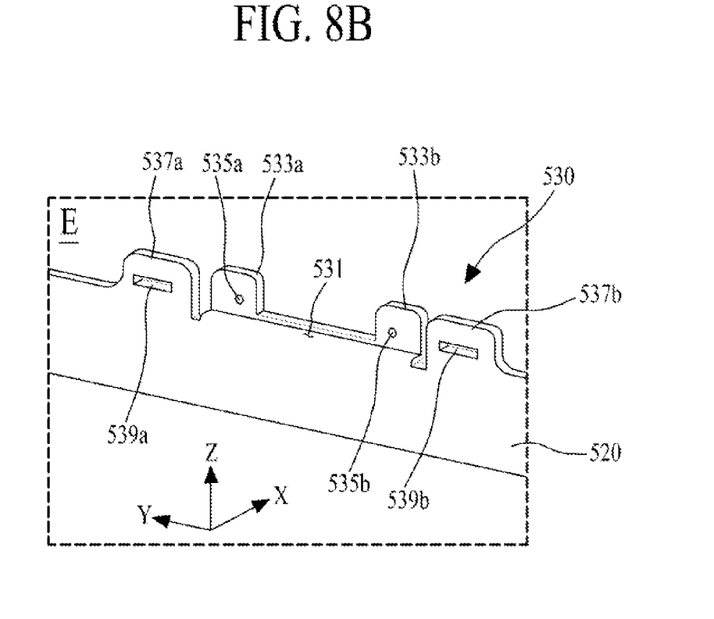
FIG. 8B is an enlarged view of a portion E in FIG. 7.

The first coupling part 530 is to be coupled to the coupling member 600 to prevent the movement of the coupling member 600 in the X-axis direction (for example, a direction toward the receiving space), the Y-axis direction (for example, a length direction of the side wall), and the Z-axis direction (for example, a height direction of the side wall). For this end, as illustrated in FIGS. 8A and 8B, the first coupling part 530 includes a bending part 531, a pair of first protruding pieces 533a and 533b, a pair of inserting holes 535a and 535b, a pair of second protruding pieces 537a and 537b, and a pair of coupling holes 539a and 539b.

The bending part 531 is bent toward the receiving space from the side wall 520 to have a certain length from the side wall 520. The bending part 531 supports the coupling member 600.

The pair of first protruding pieces 533a and 533b protrudes vertically from the bending part at both sides of the bending part 531 to have a certain height from the bending part 531 and separated from each other by a certain distance in a direction parallel to the side wall 520. The pair of first protruding pieces 533a and 533b is coupled to the coupling member 600, thereby preventing the movement of the coupling member 600 in the X-axis direction.

The pair of inserting holes 535a and 535b is formed to respectively pass through the pair of first protruding pieces 533a and 533b. The pair of inserting holes 535a and 535b is coupled to the coupling member 600, and thus prevents the movement of the coupling member 600 in the Y-axis and Z-axis directions.

The pair of second protruding pieces 537a and 537b protrudes vertically from the side wall 520 adjacent to each of the pair of first protruding pieces 533a and 533b to have a certain height. The pair of second protruding pieces 537a and 537b prevents the movement of the coupling member 600 in the X-axis direction.

The pair of coupling holes 539a and 539b is formed to respectively pass through the pair of second protruding pieces 537a and 537b. The pair of coupling holes 539a and 539b is coupled to a hook coupling protrusion 632 of the coupling member 600 (see the description below), and thus prevent the movement of the coupling member 600 in the X-axis, Y-axis, and Z-axis directions.

The first coupling part 530 is formed in plurality to have a certain interval, on the side wall 520. For example, the rear cover 500 may include: fourteen first coupling parts 530 that are formed at a long side of the side wall 520; and ten first coupling parts 530 that are formed at a short side of the side wall 520, but the present embodiment is not limited thereto. As another example, the number of first coupling parts 530 may vary according to the size of the display panel 100.

Figure 9:
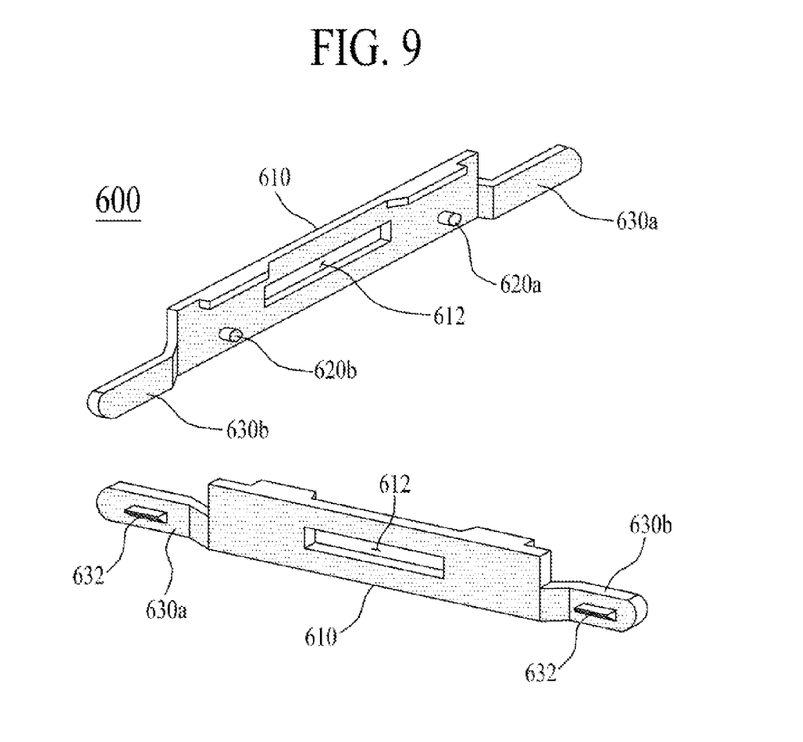
FIG. 9 is a view for describing a coupling member of FIG. 7.

The coupling member 600, as illustrated in FIG. 9, include a coupling plate 610, a pair of bosses 620a and 620b, and a pair of second coupling parts 630a and 630b.

The coupling plate 610 is formed in a flat type to have a hook coupling hole 612 which is to be coupled to the front cover 400. Herein, the coupling plate 610 may be formed of a soft material, for smooth coupling to or decoupling from the first coupling part 530 of the rear cover 500. The coupling plate 610, as illustrated in (a) and (b) in FIG. 10, rests on the bending part 531 of the first coupling part 530 when the coupling member 600 is coupled to the first coupling part 530.

The pair of bosses 620a and 620b protrudes to have a certain height from an inner side surface of the coupling plate 610, with the hook coupling hole 612 therebetween. As illustrated in (a) and (b) in FIG. 10, when coupled to the first coupling part 530, the pair of bosses 620a and 620b is inserted into the pair of inserting holes 535a and 535b, respectively. Accordingly, the movement of the coupling member 600 in the Y-axis and Z-axis directions is prevented by the pair of bosses 620a and 620b that are respectively inserted into the pair of inserting holes 535a and 535b.

The pair of second coupling parts 630a and 630b is respectively extended from both sides of the coupling plate 610 to have a certain length. When coupled to the first coupling part 530, the pair of second coupling parts 630a and 630b contacts respective inner side surfaces of the pair of second protruding pieces 537a and 537b, and are respectively coupled to the pair of coupling holes 539a and 539b. For this end, each of the pair of second coupling parts 630a and 630b includes a hook coupling protrusion 632. Therefore, when coupled to the first coupling part 530, as illustrated in (a) and (b) in FIG. 10, the pair of second coupling parts 630a and 630b is respectively coupled to the pair of coupling holes 539a and 539b by the hook coupling protrusion 632 that is inserted into each of the pair of coupling holes 539a and 539b formed at the first coupling part 530. Accordingly, the movement of the coupling member 600 in the X-axis, Y-axis, and Z-axis directions is prevented by the coupling between the second coupling part 630a and the coupling hole 539a and the coupling between the second coupling part 630b and the coupling hole 539b.

Figure 10:
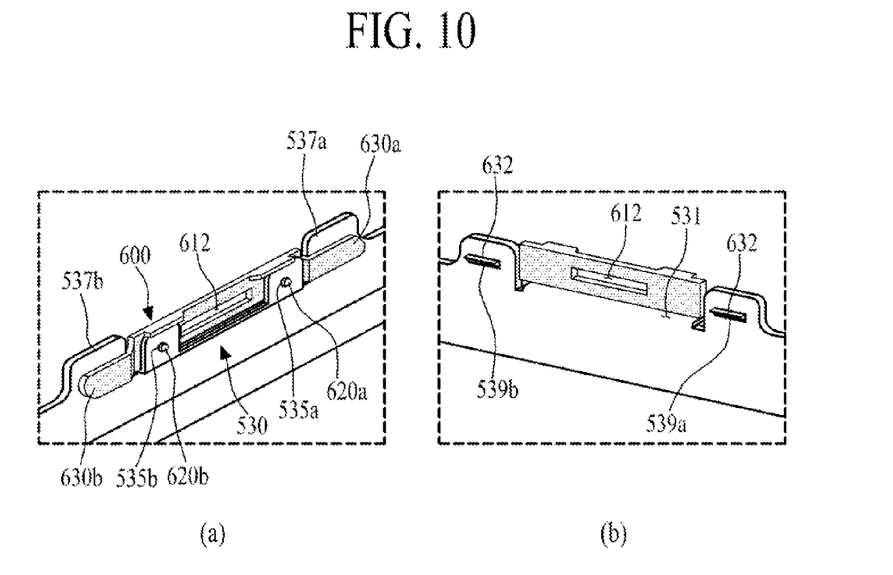
FIG. 10 is a view illustrating the coupling member which is coupled to a rear cover of FIG. 7.

When coupled to the first coupling part 530, the coupling member 600 rests on the bending part 531 of the first coupling part 530, and detachably coupled to the first coupling part 530 through the pair of bosses 620a and 620b and second coupling parts 630a and 630b. Accordingly, the movement of the coupling member 600 in the X-axis, Y-axis, and Z-axis directions is prevented by the coupling structure of the first coupling part 530.

Referring again to FIG. 7, the front cover 400 is formed in a rectangular frame shape. The front cover 400 is coupled to a plurality of the coupling members 600 which have been coupled to the rear cover 500, and thus surrounds a front border portion of the display panel 100 (which is placed in the rear cover 500) and a side surface of the rear cover 500. For this end, as illustrated in an enlarged portion F in FIG. 7, the front cover 400 includes a front cover part 410, a side cover part 420, and a third coupling part 430. The front cover 400 having such a configuration is the same as the above-described front cover of the display device according to the first embodiment, and thus, its detailed description is not provided. Hereinafter, like reference numerals refer to like elements.

Figure 11:
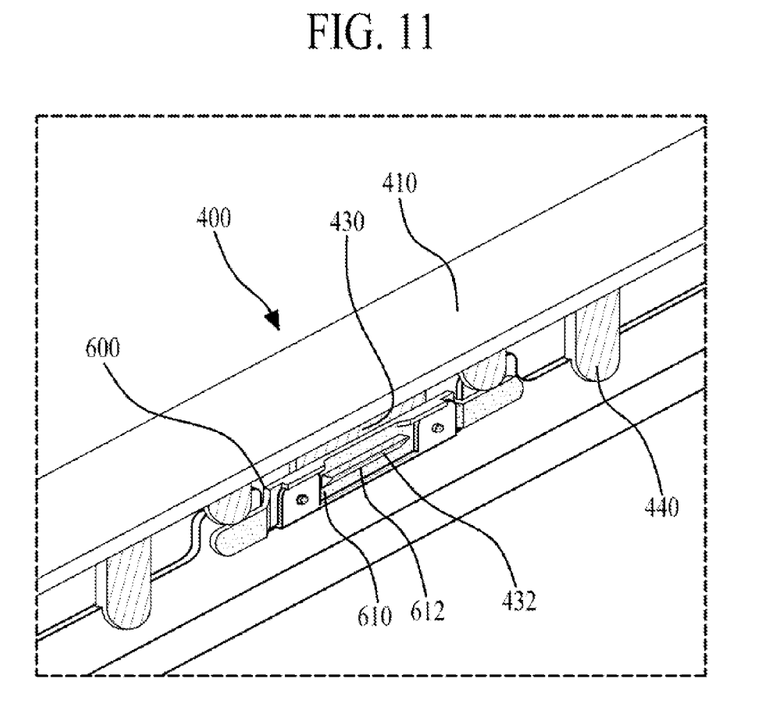
FIG. 11 is a view illustrating a coupled state of the rear cover, coupling member, and front cover of FIG. 7.

The front cover 400, as illustrated in FIG. 11, is coupled to the hook coupling hole 612 of the coupling member 600 through the hook member 432 of the third coupling part 430, and thus surrounds the front border portion of the display panel 100 (which is placed in the rear cover 500) and the side surface of the rear cover 500.

The display device according to the second embodiment of the present invention, as illustrated in the enlarged portion F in FIG. 7, may further include an interval maintaining member 440 that is formed in the front cover 400 and maintains a constant interval between the front cover part 410 of the front cover 400 and the side wall 520 of the rear cover 500.

The interval maintaining member 440 is formed vertically from the bottom of the front cover part 410 to be adjacent to both sides of each of a plurality of the third coupling parts 430 that are formed in the front cover 400. The interval maintaining member 440, as illustrated in FIG. 11, rests on the side wall 520 when the front cover 400 is coupled to the coupling members 600, and thus maintains a constant interval between the front cover part 410 of the front cover 400 and the side wall 520 of the rear cover 500.

In the display device according to the second embodiment of the present invention, by coupling the coupling member 600 to the rear cover 500 and coupling the front cover 400 to the coupling member 600, the rear cover 500 can be prevented from being damaged when the front cover 400 is coupled to or decoupled from the rear cover 500. Moreover, the rear cover 500, the coupling member 600, and the front cover 400 are coupled to each other through a hook coupling scheme, thus improving assemblability. Furthermore, by coupling the flat type coupling member 600 to the first coupling part 530 including the bending part 531 which is bent toward the receiving space from the side wall 520 of the rear cover 500, the Bezel width of the display device can be reduced.

According to the embodiments of the present invention, by coupling the coupling member to the rear cover and coupling the front cover to the coupling member, the rear cover can be prevented from being damaged when the front cover is coupled to or decoupled from the rear cover.

Moreover, the rear cover, the coupling member, and the front cover are coupled to each other through the hook coupling scheme, thus improving assemblability.

Moreover, by coupling the flat type coupling member to the first coupling part that is formed to be bent toward the receiving space from the side wall of the rear cover, the Bezel width of the display device can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
    a rear cover comprising a rear plate and a side wall forming a receiving space for receiving a display panel, and a first coupling part formed at the side wall;
    a coupling member detachably coupled to the first coupling part; and
    a front cover formed to surround a front border portion of the display panel, and detachably coupled to the coupling member,
    wherein the coupling member comprises:
    a coupling plate comprising a hook coupling hole to be coupled to the front cover;
    a pair of bosses protruding from an inner side surface of the coupling plate and to be inserted into the first coupling part, with the hook coupling hole being between the pair of bosses; and
    a pair of second coupling parts respectively formed at both sides of the coupling plate.

2. The display device of claim 1, wherein the first coupling part comprises:
    a bending part bent toward the receiving space from the side wall;
    a pair of protruding pieces protruding vertically from the bending part at both sides of the bending part; and
    a pair of inserting holes formed to respectively pass through the pair of protruding pieces,
    wherein when the coupling member is coupled to the first coupling part, the pair of bosses being respectively inserted into the pair of inserting holes, the coupling plate being resting on the bending part and the pair of second coupling parts being coupled to both sides of the first coupling part.

3. The display device of claim 1, wherein the front cover comprises:
    a front cover part surrounding the front border portion of the display panel;
    a side cover part bent vertically from the front cover part, and surrounding the side wall; and
    a third coupling part formed vertically from the bottom of the front cover part in parallel to the side cover part and to be coupled to the hook coupling hole.

4. The display device of claim 1, wherein the front cover comprises:
    a front cover part surrounding the front border portion of the display panel;

a side cover part bent vertically from the front cover part, and surrounding the side wall; and a third coupling part formed from an inner side of the side cover part and to be coupled to the hook coupling hole.

5. The display device of claim 1, further comprising:
a receiving case placed in the storage space;
a back light unit disposed in the receiving case; and
a guide frame supported by the receiving case to support the display panel.

6. The display device of claim 1, wherein the first coupling part prevents movement of the coupling member in X-axis, Y-axis, and Z-axis directions.

7. The display device of claim 1, wherein the display panel is a liquid crystal display panel, a plasma display panel, or an organic light emitting display panel.

8. A display device, comprising:
a rear cover comprising a rear plate and a side wall forming a receiving space for receiving a display panel, and a first coupling part formed at the side wall;
a coupling member detachably coupled to the first coupling part; and
a front cover formed to surround a front border portion of the display panel, and detachably coupled to the coupling member,
wherein the coupling member comprises:
a coupling plate comprising a hook coupling hole to be coupled to the front cover;
a pair of bosses protruding from an inner side surface of the coupling plate and to be inserted into the first coupling part, with the hook coupling hole being between the pair of bosses; and
a pair of second coupling parts respectively extended from both sides of the coupling plate.

9. The display device of claim 8, wherein the first coupling part comprises:
a bending part bent toward the receiving space from the side wall;
a pair of first protruding pieces protruding vertically from the bending part at both sides of the bending part;
a pair of inserting holes formed to respectively pass through the pair of first protruding pieces;
a pair of second protruding pieces protruding from the side wall adjacent to each of the pair of first protruding pieces; and
a pair of coupling holes formed to respectively pass through the pair of second protruding pieces,
wherein when the coupling member is coupled to the first coupling part, the pair of bosses being respectively inserted into the pair of inserting holes, the coupling plate being resting on the bending part and the pair of second coupling parts being coupled to the pair of coupling holes.

10. The display device of claim 8, wherein the front cover comprises:
a front cover part surrounding the front border portion of the display panel;
a side cover part bent vertically from the front cover part, and surrounding the side wall; and
a third coupling part formed vertically from the bottom of the front cover part in parallel to the side cover part and to be coupled to the hook coupling hole.

11. The display device of claim 8, wherein the front cover comprises:
a front cover part surrounding the front border portion of the display panel;
a side cover part bent vertically from the front cover part, and surrounding the side wall; and
a third coupling part formed from an inner side of the side cover part and to be coupled to the hook coupling hole.

12. The display device of claim 8, further comprising:
a receiving case placed in the storage space;
a back light unit disposed in the receiving case; and
a guide frame supported by the receiving case to support the display panel.

13. The display device of claim 8, wherein the first coupling part prevents movement of the coupling member in X-axis, Y-axis, and Z-axis directions.

14. The display device of claim 8, wherein the display panel is a liquid crystal display panel, a plasma display panel, or an organic light emitting display panel.

15. A display device, comprising:
a rear cover comprising a side wall which forms a receiving space for receiving a display panel;
a coupling member detachably coupled to the side wall; and
a front cover formed to surround a front border portion of the display panel, and detachably coupled to the coupling member,
wherein the coupling member comprises:
a coupling plate comprising a hook coupling hole to be coupled to the front cover;
a pair of bosses protruding from an inner side surface of the coupling plate and to be inserted into the side wall, with the hook coupling hole being between the pair of bosses; and
a pair of hook coupling protrusions respectively formed at both sides of the coupling plate.

16. The display device of claim 15, wherein the rear cover comprises:
a bending part bent toward the receiving space from the side wall;
a pair of protruding pieces protruding vertically from the bending part at both sides of the bending part; and
a pair of inserting holes formed to respectively pass through the pair of protruding pieces,
wherein the pair of bosses being respectively inserted into the pair of inserting holes, the coupling plate being resting on the bending part and the part of hook coupling protrusions being coupled to both sides of the first coupling part.

17. The display device of claim 15, wherein the rear cover comprises:
a bending part bent toward the receiving space from the side wall;
a pair of first protruding pieces protruding vertically from the bending part at both sides of the bending part;
a pair of inserting holes formed to respectively pass through the pair of first protruding pieces;
a pair of second protruding pieces protruding from the side wall adjacent to each of the pair of first protruding pieces; and
a pair of coupling holes formed to respectively pass through the pair of second protruding pieces,
wherein the pair of bosses are respectively inserted into the pair of inserting holes, the coupling plate resting on the bending part and the pair of part of hook coupling protrusions being coupled to the pair of coupling holes.

18. The display device of claim 15, further comprising:
a receiving case placed in the storage space;
a back light unit disposed in the receiving case; and
a guide frame supported by the receiving case to support the display panel.

19. The display device of claim 15, wherein the display panel is a liquid crystal display panel, a plasma display panel, or an organic light emitting display panel.

* * * * *